United States Patent
Senda et al.

(10) Patent No.: US 12,540,931 B2
(45) Date of Patent: Feb. 3, 2026

(54) GAS ANALYZER

(71) Applicant: SHIMADZU CORPORATION, Kyoto (JP)

(72) Inventors: Atsuko Senda, Kyoto (JP); Toshihisa Itabashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 314 days.

(21) Appl. No.: 18/288,086

(22) PCT Filed: Jan. 28, 2022

(86) PCT No.: PCT/JP2022/003388
§ 371 (c)(1),
(2) Date: Oct. 24, 2023

(87) PCT Pub. No.: WO2022/230269
PCT Pub. Date: Nov. 3, 2022

(65) Prior Publication Data
US 2024/0210369 A1 Jun. 27, 2024

(30) Foreign Application Priority Data
Apr. 26, 2021 (JP) ................................. 2021-074001

(51) Int. Cl.
*G01N 33/00* (2006.01)
*G01N 1/42* (2006.01)

(52) U.S. Cl.
CPC ........... *G01N 33/0027* (2013.01); *G01N 1/42* (2013.01)

(58) Field of Classification Search
CPC ................. G01N 33/0027; G01N 1/42; G01N 2001/2282; G01N 1/2258; B01D 53/26
See application file for complete search history.

(56) References Cited

U.S. PATENT DOCUMENTS

2008/0073206 A1* 3/2008 Nogawa ............... G01N 21/553
137/563

FOREIGN PATENT DOCUMENTS

| CN | 110156190 A | * | 8/2019 | ............. G01N 33/18 |
| CN | 111287715 A | * | 6/2020 | ......... G01N 33/0004 |

(Continued)

OTHER PUBLICATIONS

Extended European Application No. issued Jul. 18, 2024 in European Application No. 22795192.8.

(Continued)

*Primary Examiner* — Francis C Gray
(74) *Attorney, Agent, or Firm* — Sughrue Mion, PLLC

(57) ABSTRACT

A gas analyzer includes a gas flow path through which an analysis target gas flows, and a drain pot upstream of an analysis unit to analyze the gas, the drain pot into which liquid generated by cooling the gas is introduced, wherein the drain pot includes: a first liquid container to receive a terminal end of a first drain flow path from which the liquid is discharged and has a communication port above the terminal end of the first drain flow path; a second drain flow path to extend outward and downward from the communication port of the first liquid container; and a second liquid container to receive a terminal end of the second drain flow path and has a discharge port above the terminal end of the first drain flow path and the terminal end of the second drain flow path, and below the communication port.

3 Claims, 6 Drawing Sheets

(56) References Cited

FOREIGN PATENT DOCUMENTS

| | | | |
|---|---|---|---|
| JP | H0678855 U | * 11/1994 | |
| JP | 2005-195327 A | 7/2005 | |
| JP | 2014-145625 A | 8/2014 | |
| JP | 2021015028 A | * 2/2021 | |
| KR | 100361667 B1 | * 11/2002 | ........... B01D 53/005 |

OTHER PUBLICATIONS

International Search Report for PCT/JP2022/003388 dated Mar. 8, 2022 (PCT/ISA/210).
Written Opinion for PCT/JP2022/003388 dated Mar. 8, 2022 (PCT/ISA/237).

* cited by examiner

GAS ANALYZER

CROSS REFERENCE TO RELATED APPLICATIONS

This application is a National Stage of International Application No. PCT/JP2022/003388 filed Jan. 28, 2022, claiming priority based on Japanese Patent Application No. 2021-074001 filed Apr. 26, 2021.

TECHNICAL FIELD

The present invention relates to a gas analyzer including a drain pot.

BACKGROUND ART

In facilities like thermal power plants and waste incineration plants, high-temperature exhaust gas generated by combustion is discharged. In order to confirm that the amount of a specific component contained in the exhaust gas does not exceed a criterion value prescribed by law, a gas analyzer is used in these facilities.

The exhaust gas generated in the facilities described above generally contains water vapor, and if such exhaust gas is introduced into the analyzer as it is, accurate measurement cannot be performed. Therefore, a cooler which cools an analysis target gas is provided in the gas flow path connecting a sampling point of the exhaust gas and the analyzer. When the exhaust gas is cooled in the cooler, water vapor is liquefied in the cooler, and the water vapor is removed from the analysis target gas. The liquefied water (drain water) is introduced into a drain pot through a drain flow path (drain pipe) (for example, Patent Literature 1).

The drain pot is provided to prevent outside air from flowing into the gas flow path through the drain flow path and being mixed with the analysis target gas. There are two types of drain pots: a sealed type, and an overflow type.

A sealed drain pot is a closed container provided with a drain port having an on-off valve, and a terminal end of the drain flow path extending from the cooler is inserted into the container. In a normal sealed drain pot, the container is closed by closing the on-off valve, which prevents outside air from flowing into the gas flow path. Since the amount of liquid in the drain pot increases as the drain water flows in from the cooler, an operator of the facility periodically stops an operation of the gas analyzer and then opens the on-off valve of the drain port to discharge the stored drain water to the outside of the drain pot.

An overflow drain pot is a container having a side wall provided with a drain port which is always open to the atmosphere, and a terminal end of the drain flow path extending from the cooler is disposed below the drain port. In the overflow drain pot, water is always stored up to the drain port (that is, above the terminal end of the drain flow path), thus preventing outside air from flowing into the gas flow path through the drain flow path and the cooler (water sealing). When the amount of water in the drain pot increases as the drain water flows in from the cooler, the drain water pours out from the drain port to the outside of the drain pot, and the height of the liquid level is maintained at the height of the drain port (that is, above the terminal end of the drain flow path).

CITATION LIST

Patent Literature

Patent Literature 1: JP 2005-195327 A

SUMMARY OF INVENTION

Technical Problem

The overflow drain pot is superior to the sealed drain pot in that it is not necessary to perform an operation of discharging drain water to the outside of the drain pot and thus time and effort for such management can be reduced, but has the following problems. The analysis target gas enters the drain flow path from the gas flow path, while the liquid in the drain pot enters the drain flow path from the terminal end of the drain flow path. The height of the liquid level in the drain flow path is the position where the pressure of the analysis target gas and the water pressure of the drain water entering the drain flow path from the drain pot are balanced. When the gauge pressure (pressure obtained by subtracting the atmospheric pressure from the absolute pressure) of the analysis target gas is x, the difference $\delta h$ between the liquid level in the drain pot and the liquid level in the drain flow path is determined as follows: $x=\delta h \cdot \rho \cdot g$ and therefore $\delta h = x/\rho \cdot g$ (where $\rho$ is the density of the liquid in the drain pot, and g is the gravitational acceleration). Therefore, when it is expected that the maximum gauge pressure of the analysis target gas will be $x_{max}$ (>0, i.e. the absolute pressure is higher than the atmospheric pressure), it is required to set the difference $\Delta H$ between the height of the drain port (i.e. the height of the liquid level in the drain pot) and the height of the terminal end of the drain flow path to be $x_{max}/\rho \cdot g$ or more in order to maintain the water-sealed state. For example, when it is expected that the maximum gauge pressure of the analysis target gas will be 10 kPa=$10^4$ Pa (about 0.1 atm), $\Delta H$ should be preferably about 980 mm or more (p is calculated as the density of water). Thus, the dimension of the drain pot would be very large depending on the expected gauge pressure of the analysis target gas.

An object of the present invention is to provide a gas analyzer including an overflow drain pot which is capable of reducing management time and effort and can be small in size.

Solution to Problem

A gas analyzer according to the present invention made to solve the above problems includes a gas flow path through which an analysis target gas flows, and a drain pot provided in the gas flow path and disposed upstream of an analysis unit configured to analyze the analysis target gas, the drain pot into which liquid generated by cooling the analysis target gas in the gas flow path is introduced, in which the drain pot includes:
  a first liquid container configured to receive a terminal end of a first drain flow path from which the liquid generated in the gas flow path is discharged, and has a communication port above the terminal end of the first drain flow path;
  a second drain flow path provided to extend outward and downward from the communication port of the first liquid container; and
  a second liquid container configured to receive a terminal end of the second drain flow path and has a discharge port provided above the terminal end of the first drain flow path and the terminal end of the second drain flow path, and below the communication port.

Advantageous Effects of Invention

In the gas analyzer according to the present invention, liquid (drain water) generated by cooling the analysis target gas is introduced into the first liquid container through the first drain flow path. In the first liquid container, the drain water is stored up to the height of the communication port and discharged from the communication port. The drain water discharged from the first liquid container is introduced into the second liquid container through the second drain flow path. In the second liquid container, the drain water is stored up to the height of the discharge port, and is discharged to the outside of the second liquid container from the discharge port.

The liquid level of the drain water in the first drain flow path is located above the height of the communication port (the height of the liquid level in the first liquid container) when the gauge pressure of the analysis target gas is negative (the absolute pressure is less than the atmospheric pressure), and is located between the communication port and the terminal end of the first drain flow path when the gauge pressure is positive (the absolute pressure exceeds the atmospheric pressure) but relatively low. When the pressure of the analysis target gas further increases, the liquid level of the drain water in the first drain flow path is pressed down to the terminal end, and the analysis target gas enters the first liquid container from the terminal end of the first drain flow path and flows into the second drain flow path through the communication port. As a result, the liquid level of the drain water in the second drain flow path is pressed down and becomes lower than the height of the discharge port (the height of the liquid level in the second liquid container). As a result, the analysis target gas of the maximum gauge pressure represented by $(\Delta H1+\Delta H2)\cdot\rho\cdot g$ obtained by multiplying $(\Delta H1+\Delta H2)$, which is a sum of a difference $\Delta H1$ in height between the communication port and the terminal end of the first drain flow path and a difference $\Delta H2$ in height between the discharge port and the terminal end of the second drain flow path, by a density $\rho$ of the drain water and a gravitational acceleration $g$, is water-sealed.

Using the conventional drain pot having only one container for storing drain water in order to water-seal the analysis target gas having the maximum gauge pressure of $(\Delta H1+\Delta H2)\cdot\rho\cdot g$ similarly to the present invention requires setting a difference $\Delta H$ between the height of the discharge port provided in the container and the height of the terminal end of the drain flow path to $(\Delta H1+\Delta H2)$ or more, and thus the height of the entire drain pot must be higher than $(\Delta H1+\Delta H2)$. On the other hand, in the present invention, the height of the entire drain pot is higher than a difference in height between the communication port (above the discharge port) and the terminal end of the second drain flow path, but since the discharge port is provided above the terminal end of the first drain flow path, a difference in height is represented by $(\Delta H1+\Delta H2-\Delta m)$. Here, $\Delta m$ is a difference in height between the discharge port and the terminal end of the first drain flow path. Since $(\Delta H1+\Delta H2-\Delta m)<(\Delta H1+\Delta H2)$, with the present invention, the height of the entire drain pot can be suppressed as compared with the height of the entire conventional drain pot, so that the drain pot can be small in size.

DESCRIPTION OF EMBODIMENTS

Figure 1:
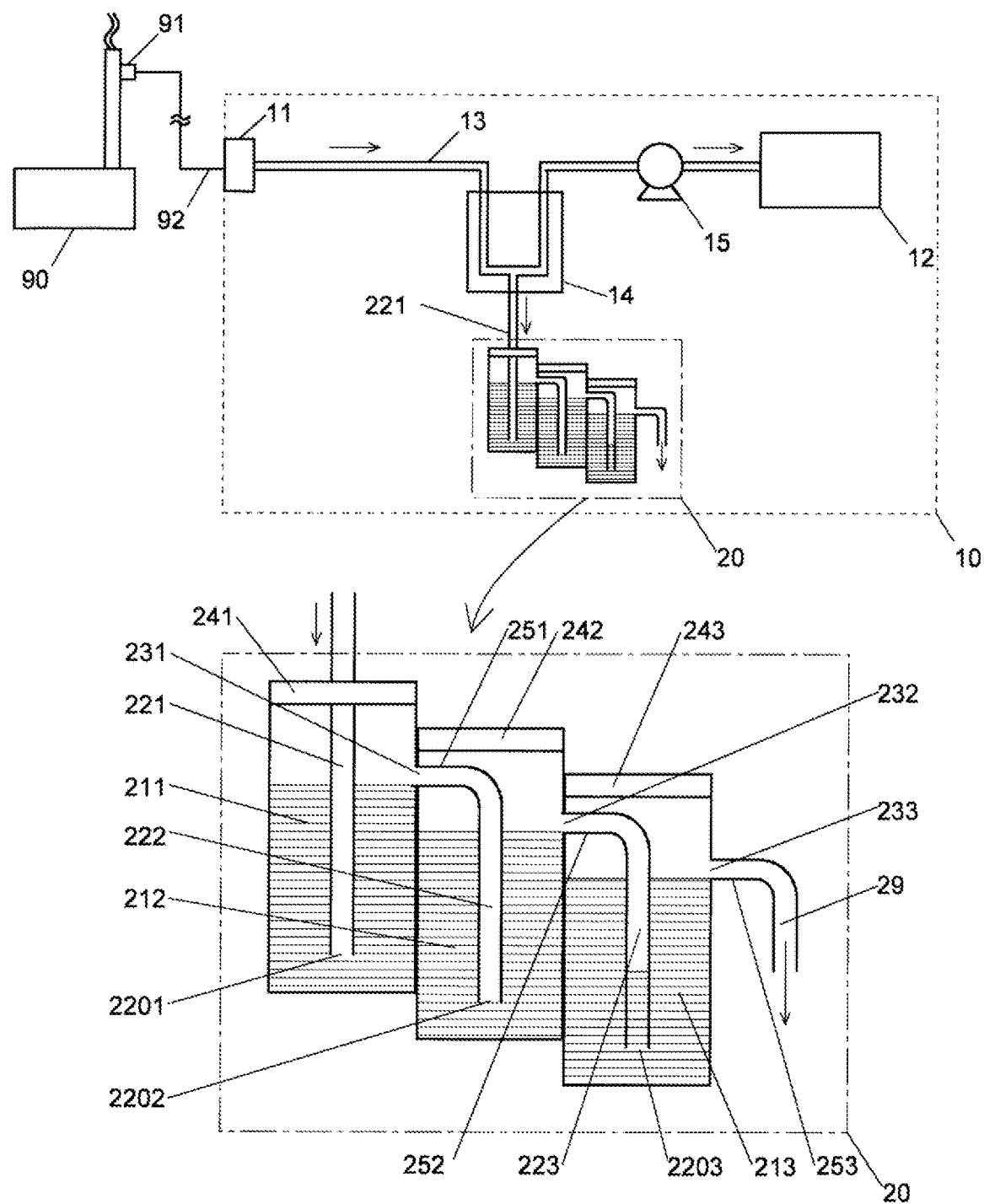
FIG. 1 is a schematic configuration diagram illustrating an embodiment of a gas analyzer according to the present invention, and an enlarged view of a part including a drain pot.

Embodiments of a gas analyzer according to the present invention will be described with reference to FIGS. 1 to 9.

(1) Configuration of Gas Analyzer of Present Embodiment

A gas analyzer 10 of the present embodiment is used to measure the concentration of a predetermined substance (for example, nitrogen oxides, sulfur oxides, carbon monoxide, carbon dioxide, and oxygen) contained in an exhaust gas collected by a gas collection probe 91 attached to a gas discharge unit of an exhaust gas generation facility 90, such as a thermal power plant, a waste incineration plant, and a factory, and introduced through a pipeline 92.

The gas analyzer 10 includes a gas intake port 11 and a gas analysis unit 12, which are connected by an analysis target gas flow path 13. For the gas analysis unit 12, for example, a non-dispersive infrared (NDIR) spectrometer is used. In addition, an analysis target gas pump 15 is connected to the analysis target gas flow path 13.

When the analysis target gas containing water vapor is introduced into the analyzer after calibration of the analyzer, an amount of water vapor in the analyzer is different between the time of calibration and the time of measurement, and the reliability of the measurement result is lowered. Therefore, the gas analyzer 10 includes a cooling unit (cooler) 14 in the analysis target gas flow path 13 from the gas intake port 11 to the gas analysis unit 12. The analysis target gas is cooled to a predetermined temperature by the cooling unit 14 and then introduced into the gas analysis unit 12. Although one cooling unit 14 is provided in the present embodiment, an analysis target gas may be cooled in stages by arranging a plurality of cooling units.

In the cooling unit 14, a first drain flow path 221 is connected to the analysis target gas flow path 13. The first drain flow path 221 extends downward. Liquid (drain water) such as water generated by cooling the analysis target gas in the cooling unit 14 is discharged to a drain pot 20 through the first drain flow path 221.

In the present embodiment, the drain pot 20 includes a first liquid container 211, a second liquid container 212, and a third liquid container 213. The first liquid container 211 has a first lid 241, the second liquid container 212 has a second lid 242, and the third liquid container 213 has a third lid 243. Any one or more (including all three) of the first lid 241, the second lid 242, and the third lid 243 may be omitted.

A terminal end 2201 of the first drain flow path 221 is disposed inside the first liquid container 211. In addition, the first liquid container 211 has a communication port 231 above the terminal end 2201 of the first drain flow path 221. A first connection pipe 251 extending outward the first liquid container 211 is connected to the communication port 231. A combination of the communication port 231 and the first connection pipe 251 can be regarded as a communication port in the present invention.

A second drain flow path 222 is provided to extend outward and downward from (the first connection pipe 251 of) the communication port of the first liquid container 211. A terminal end 2202 of the second drain flow path 222 is disposed inside the second liquid container 212.

In addition, the second liquid container 212 has a first discharge port 232 above the terminal end 2201 of the first drain flow path 221 and the terminal end 2202 of the second drain flow path 222, and below the communication port 231. A second connection pipe 252 extending outward the second liquid container 212 is connected to the first discharge port 232. A combination of the first discharge port 232 and the second connection pipe 252 can be regarded as a discharge port in the present invention.

A third drain flow path 223 is provided to extend outward and downward from (the second connection pipe 252 of) the discharge port of the second liquid container 212. A terminal end 2203 of the third drain flow path 223 is disposed inside the third liquid container 213. As a result, the second liquid container 212 and the third liquid container 213 communicate with each other via the first discharge port 232 and the third drain flow path 223.

In addition, the third liquid container 213 has a second discharge port 233 above the terminal end 2202 of the second drain flow path 222 and the terminal end 2203 of the third drain flow path 223, and below the first discharge port 232. A third connection pipe 253 extending outward the third liquid container 213 is connected to the second discharge port 233, and a discharge pipe 29 extending downward is connected to the third connection pipe 253.

Figure 2:
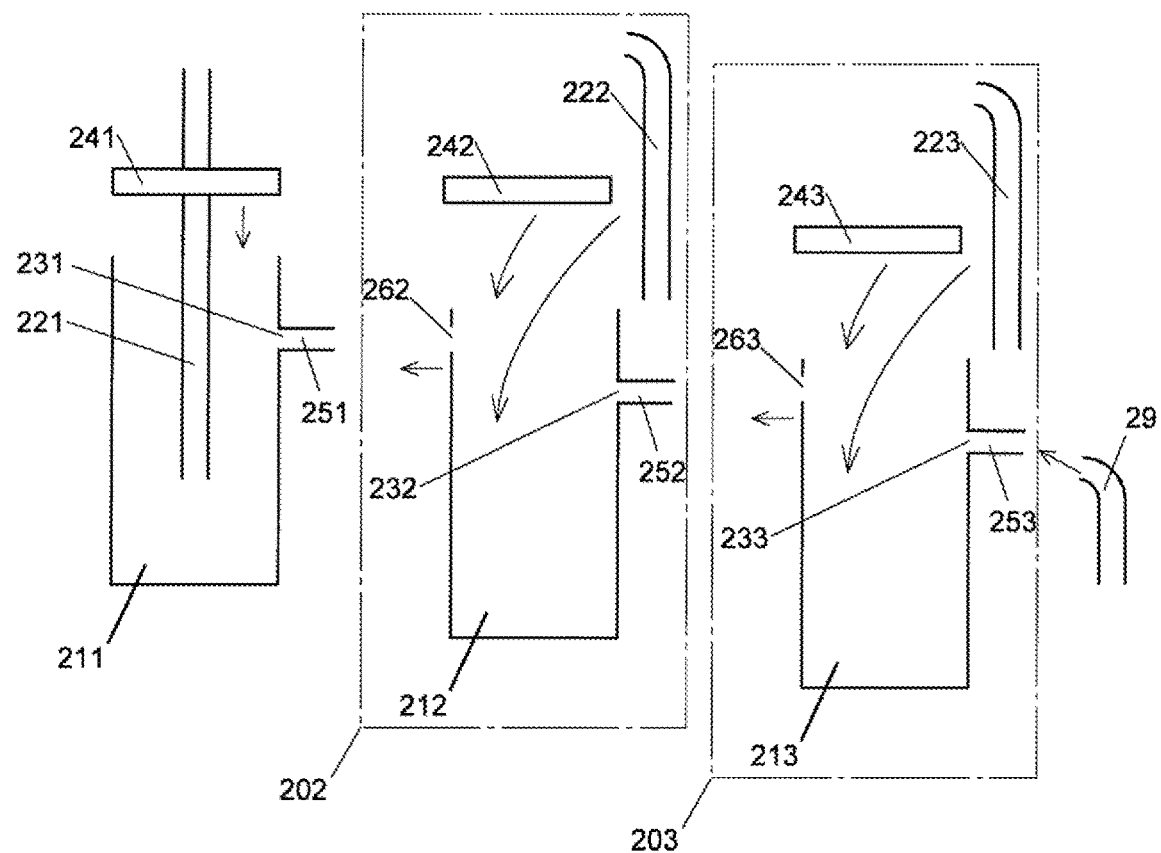
FIG. 2 is an exploded view of the drain pot in the gas analyzer of the present embodiment.

FIG. 2 illustrates an exploded view of the drain pot 20. The first liquid container 211, the second liquid container 212, and the third liquid container 213 can be separated from each other.

A first connection pipe insertion port 262 is provided on a side surface of the second liquid container 212, and the first liquid container 211 and the second liquid container 212 are integrated by inserting the first connection pipe 251 into the first connection pipe insertion port 262. After the first connection pipe 251 is inserted into the first connection pipe insertion port 262, the second drain flow path 222 is connected to the first connection pipe 251, and then the second lid 242 is attached.

Similarly, a second connection pipe insertion port 263 is provided on a side surface of the third liquid container 213, and the second liquid container 212 and the third liquid container 213 are integrated by inserting the second connection pipe 252 into the second connection pipe insertion port 263. After the second connection pipe 252 is inserted into the second connection pipe insertion port 263, the third drain flow path 223 is connected to the second connection pipe 252, and then the third lid 243 is attached.

Figure 3:
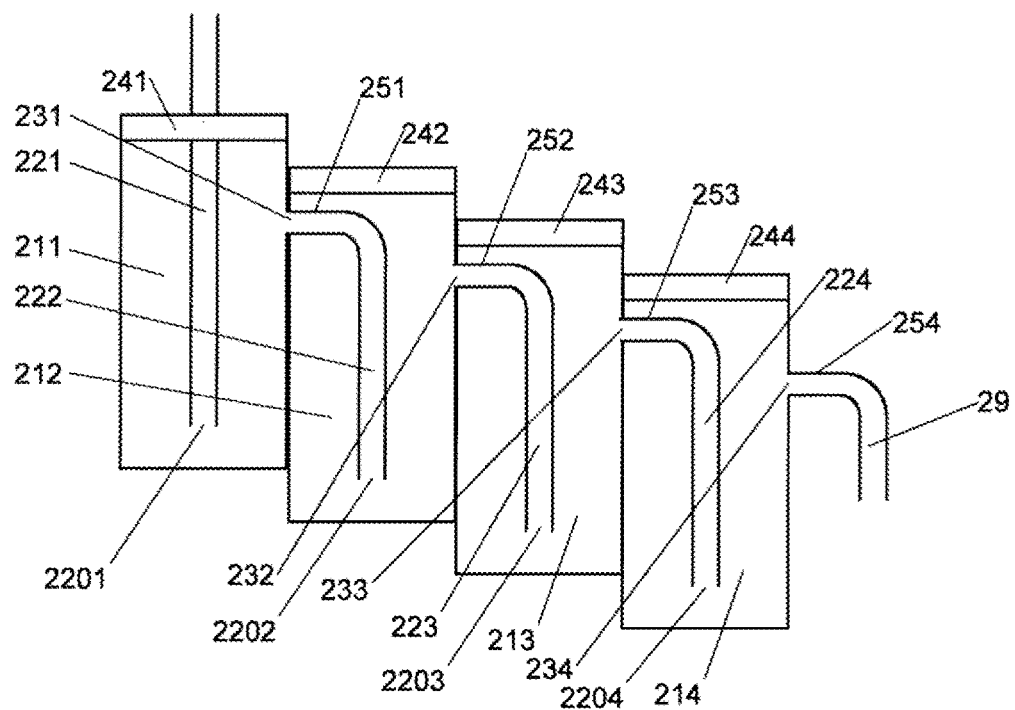
FIG. 3 is a schematic configuration diagram illustrating a modification of the drain pot in the gas analyzer according to the present invention.
Figure 4:
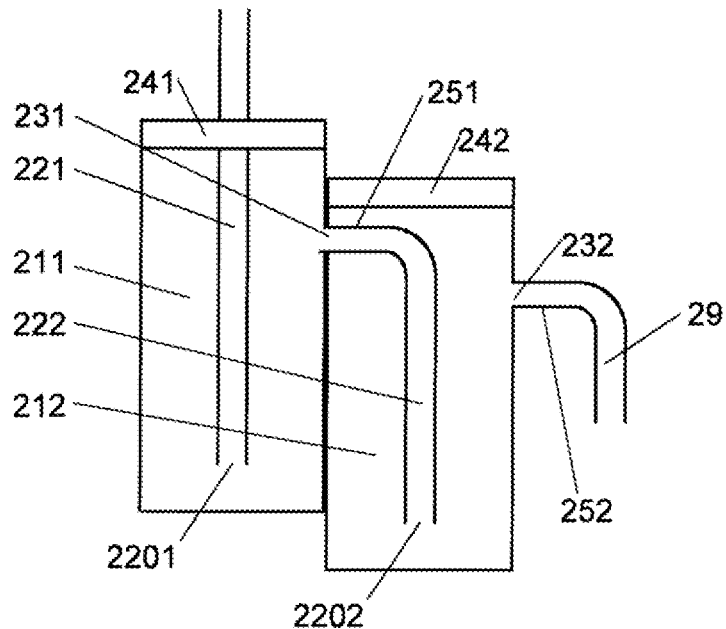
FIG. 4 is a schematic configuration diagram illustrating another modification of the drain pot in the gas analyzer according to the present invention.

A container set 202 in which the second liquid container 212 (including the second lid 242 and the second connection pipe 252) and the second drain flow path 222 are combined have the same structure as a container set 203 in which the third liquid container 213 (including the third lid 243 and the third connection pipe 253) and the third drain flow path 223 are combined. By connecting to the third liquid container 213 a container set 204 obtained by combining a fourth liquid container 214 (including a fourth lid 244 and a fourth connection pipe 254) and a fourth drain flow path 224 having the same structure as those of the container sets 202 and 203, a drain pot including the four liquid containers can be configured as illustrated in FIG. 3. Similarly, a drain pot including five or more liquid containers can be configured. Alternatively, the container set 203 may be omitted to form a drain pot including two liquid containers as illustrated in FIG. 4. As described later, the pressure of the analysis target gas that can be water-sealed can be increased as the number of liquid containers is increased.

When the gas analyzer 10 is installed in the exhaust gas generation facility 90, the number of liquid containers included in the drain pot 20 is determined depending on the maximum pressure of the analysis target gas generated from the exhaust gas generation facility 90. At the time of the installation operation, a plurality of container sets having the same configuration as described above are prepared in advance, and only a necessary number of the prepared container sets may be used depending on the actual maximum pressure of the analysis target gas. As a result, more liquid containers than necessary are not connected, so that a space occupied by drain pot 20 can be suppressed. In addition, since an operator can take away the container set left without being used and use the container set in another gas analyzer, the drain pot 20 can be flexibly set depending on the maximum pressure of the analysis target gas without causing waste.

(2) Operation of Drain Pot 20 in Gas Analyzer of Present Embodiment

The operation of the gas analyzer of the present embodiment is similar to the operation of the conventional gas analyzer except for the operation of the drain pot 20. The operation of drain pot 20 will be described below.

In the first liquid container 211, the second liquid container 212, and the third liquid container 213, water is stored to the heights of the communication port 231, the first discharge port 232, and the second discharge port 233 in advance.

Drain water generated by cooling the analysis target gas in the cooling unit 14 flows into the first liquid container 211 through the first drain flow path 221. As a result, the water in the first liquid container 211 overflows, and flows into the second liquid container 212 from the communication port 231 through the second drain flow path 222. In addition, as a result of this, the water in the second liquid container 212 overflows, and flows into the third liquid container 213 from the first discharge port 232 through the third drain flow path 223. Then, the water in third liquid container 213 overflows, and is discharged from the second discharge port 233 to the outside of the drain pot 20 through the discharge pipe 29. The water discharged is recovered, and treatment such as removal of components of the analysis target gas (exhaust gas) contained in the water is performed.

Figure 5A:
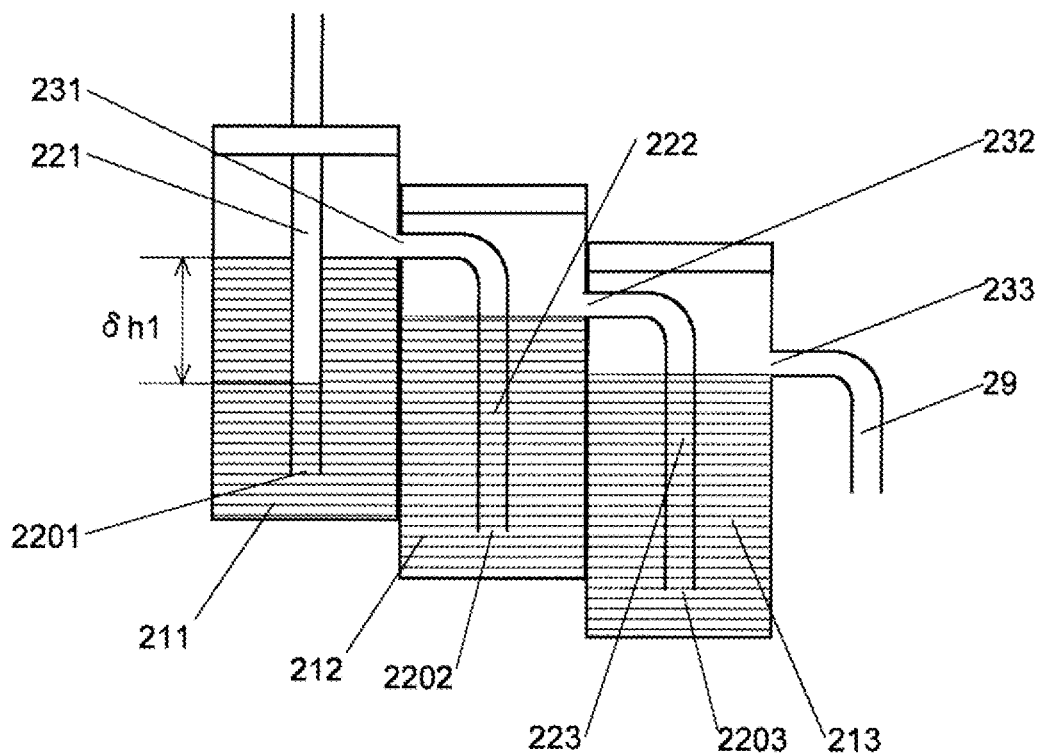
FIG. 5A is a diagram for explaining an operation of the drain pot in the gas analyzer of the present embodiment, and is a diagram illustrating a state where the gauge pressure of an analysis target gas is positive.

When the gauge pressure $P_G$ of the analysis target gas flowing through the analysis target gas flow path 13 is 0 (absolute pressure is the atmospheric pressure), the height of the liquid level of the drain water in the first drain flow path 221 is the same as the height of the liquid level in the first liquid container 211 (that is, the height of the communication port 231), but when the gauge pressure $P_G$ of the analysis target gas is positive (absolute pressure is higher than the atmospheric pressure), the height of the liquid level is pressed below the height of the liquid level in the first liquid container 211. When a gauge pressure $P_G$ of the analysis target gas is $\delta h1 \cdot \rho \cdot g$ (where, $\rho$ is a density of the drain water and g is a gravitational acceleration), a difference in height between the liquid level in the first liquid container 211 and the liquid level in the first drain flow path 221 is $\delta h1$ (FIG. 5A). Here, when a difference in height between the communication port 231 and the terminal end 2201 of the first drain flow path 221 is $\Delta H1$, $\delta h1 \leq \Delta H1$ is satisfied.

Figure 5B:
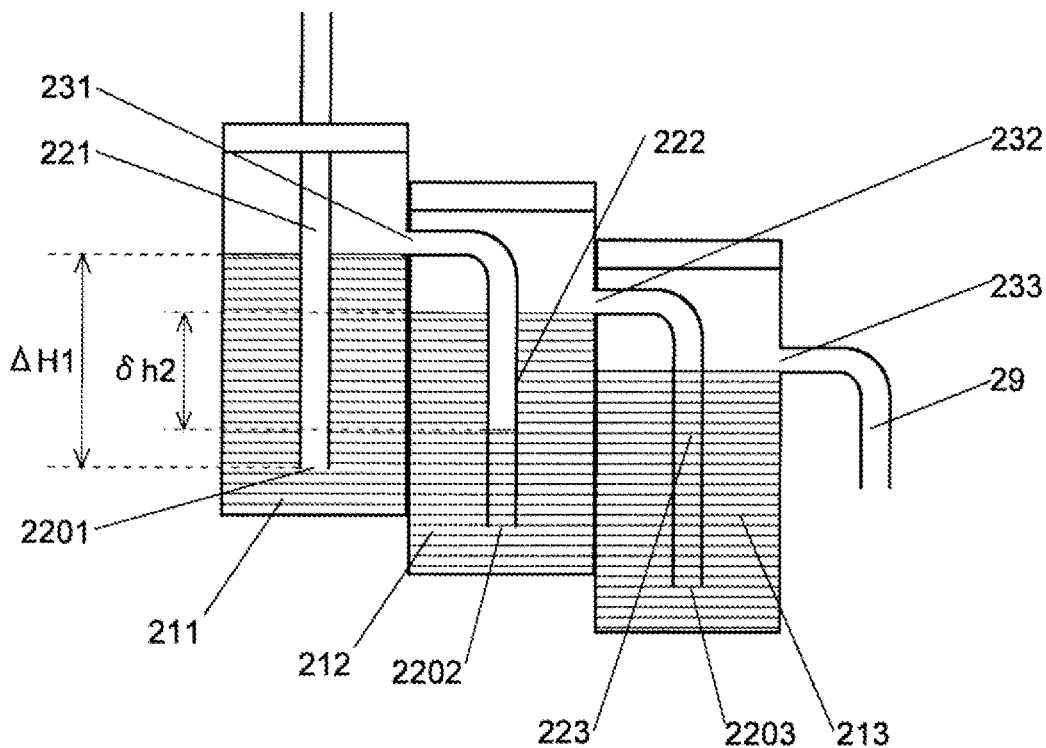
FIG. 5B is a diagram for explaining an operation of the drain pot in the gas analyzer of the present embodiment, and is a diagram illustrating a state where the pressure of the analysis target gas is higher than that illustrated in FIG. 5A.

When the gauge pressure $P_G$ of the analysis target gas becomes higher than $\Delta H1 \cdot \rho \cdot g$, the liquid level in the first drain flow path 221 is pressed down to the terminal end 2201 of the first drain flow path 221. In addition, the analysis target gas flows into the second drain flow path 222 through the communication port 231, and the height of the liquid level in the second drain flow path 222 is pressed below the height of the liquid level in the second liquid container 212 (that is, the height of the first discharge port 232). When the gauge pressure $P_G$ of the analysis target gas is $(\Delta H1+\delta h2) \cdot \rho \cdot g$, a difference in height between the liquid level in the second liquid container 212 and the liquid level in the second drain flow path 222 is $\delta h2$ (FIG. 5B). Here, when a difference in height between the first discharge port 232 and the terminal end 2202 of the second drain flow path 222 is $\Delta H2$, $\delta h2 \leq \Delta H2$ is satisfied.

Figure 5C:
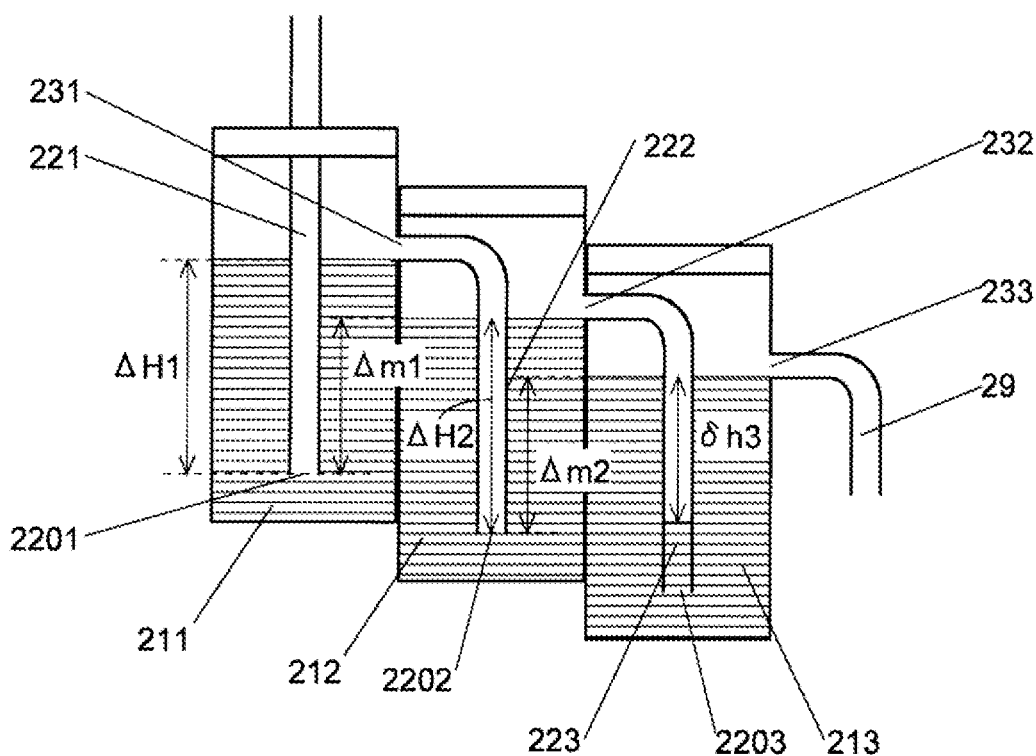
FIG. 5C is a diagram for explaining an operation of the drain pot in the gas analyzer of the present embodiment, and is a diagram illustrating a state where the pressure of the analysis target gas is higher than that illustrated in FIG. 5B.

When the gauge pressure $P_G$ of the analysis target gas becomes higher than $(\Delta H1+\Delta H2) \cdot \rho \cdot g$, the liquid level in the second drain flow path 222 is pressed down to the terminal end 2202 of the second drain flow path 222. In addition, the analysis target gas flows into the third drain flow path 223 through the first discharge port 232, and the height of the liquid level in the third drain flow path 223 is pressed below the height of the liquid level in the third liquid container 213 (that is, the height of the second discharge port 233). When the gauge pressure $P_G$ of the analysis target gas is $(\Delta H1+\Delta H2+\delta h3) \cdot \mu g$, a difference in height between the liquid level in the third liquid container 213 and the liquid level in the third drain flow path 223 is $\delta h3$ (FIG. 5C). Here, when a difference in height between the second discharge port 233 and the terminal end 2203 of the third drain flow path 223 is $\Delta H3$, $\delta h3 \leq \Delta H3$ is satisfied.

When the gauge pressure $P_G$ of the analysis target gas further increases and the liquid level in the third drain flow path 223 is pressed down to the terminal end 2203 of the third drain flow path 223, the gauge pressure $P_G$ at this time is $(\Delta H1+\Delta H2+\Delta H3) \cdot \rho \cdot g$, which is the maximum gauge pressure $P_{Gmax}$ that can be water-sealed by the drain pot 20 having the three liquid containers illustrated in FIGS. 1 and 5A to 5C.

If the analysis target gas having the maximum gauge pressure $P_{Gmax}=(\Delta H1+\Delta H2+\Delta H3) \cdot \rho \cdot g$ described above is water-sealed with a drain pot having only one liquid container, a difference in height between the discharge port of the liquid container and the end of the drain flow path needs to be set to be $(\Delta H1+\Delta H2+\Delta H3)$. On the other hand, in the present embodiment, a difference in height between the communication port 231 which is a discharge port having the highest position and the terminal end 2203 of the third drain flow path 223 which is a terminal end of the drain flow path having the lowest position is $(\Delta H1+\Delta H2+\Delta H3-\Delta m1-\Delta m2)$. Here, $\Delta m1$ is a difference in height between the first discharge port 232 and the terminal end 2201 of the first drain flow path 221, and $\Delta m2$ is a difference in height between the second discharge port 233 and the terminal end 2202 of the second drain flow path 222. $\Delta m1$ and $\Delta m2$ are subtracted from $(\Delta H1+\Delta H2+\Delta H3)$ because the first discharge port 232 is disposed above the terminal end 2201 of the first drain flow path 221 and the second discharge port 233 is disposed above the terminal end 2202 of the second drain flow path 222. Since $(\Delta H1+\Delta H2+\Delta H3-\Delta m1-\Delta m2) < (\Delta H1+\Delta H2+\Delta H3)$ is satisfied, the height of the entire drain pot 20 in the present embodiment can be made smaller than that of a drain pot having only one liquid container.

On the other hand, a size of the cross-sectional area of the drain pot does not affect the pressure of the analysis target gas that can be water-sealed. Therefore, even in the case of using a plurality of liquid containers as in the present embodiment, reducing the cross-sectional area of each liquid container allows a space occupied by the drain pot in the lateral direction to be equal to or smaller than the conventional space.

As described above, according to the gas analyzer of the present embodiment, the drain pot 20 can be small in size as compared with the conventional one.

In the drain pot having the four liquid containers illustrated in FIG. 3, the maximum gauge pressure $P_{Gmax}$ is $(\Delta H1+\Delta H2+\Delta H3+\Delta H4) \cdot \rho \cdot g$ (where, $\Delta H4$ is a difference in height between a third discharge port 234 and a terminal end 2204 of the fourth drain flow path 224), and the maximum gauge pressure is higher than that in the drain pot 20 having the three liquid containers illustrated in FIGS. 1 and 5A to 5C. When the number of drain pots is further increased, the maximum gauge pressure can be further increased. In addition, in the drain pot having the two liquid containers illustrated in FIG. 4, the maximum gauge pressure $P_{Gmax}$ is $(\Delta H1+\Delta H2) \cdot \rho \cdot g$, which is lower than a maximum gauge pressure in the drain pot 20 illustrated in FIGS. 1 and 5A to 5C, but the height of the entire drain pot can be suppressed as compared with the drain pot 20.

Figure 6:
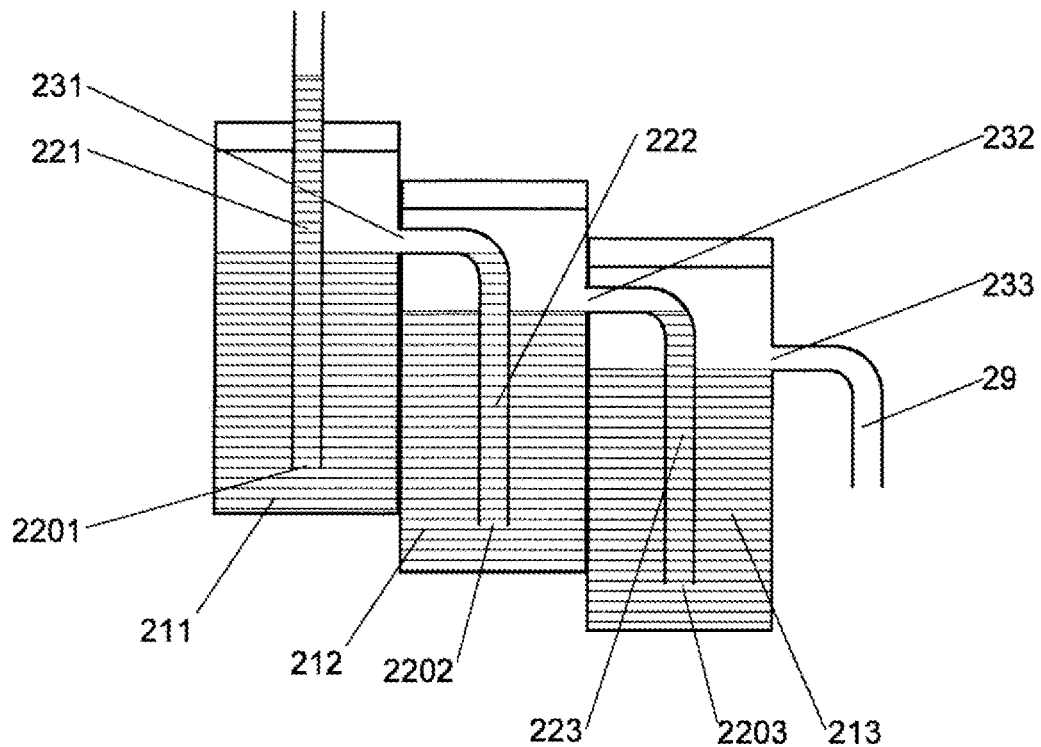
FIG. 6 is a diagram for explaining an operation of the drain pot in the gas analyzer of the present embodiment, and is a diagram illustrating an example of a state where the gauge pressure of the analysis target gas is negative.

A case where the gauge pressure $P_G$ of the analysis target gas is positive, that is, the absolute pressure of the analysis target gas exceeds the atmospheric pressure has been described so far, however, as illustrated in FIG. 6, even when the gauge pressure $P_G$ of the analysis target gas is negative, that is, the absolute pressure of the analysis target gas is less than the atmospheric pressure, water sealing can be achieved by the drain pot 20. In this case, when a gauge pressure $P_G$ of the analysis target gas is relatively close to the atmospheric pressure, the liquid levels of the first drain flow path 221 and the second drain flow path 222 are the same as the liquid levels of the first liquid container 211 and the second liquid container 212, respectively, and the liquid level of the third drain flow path 223 is higher than the liquid level of the third liquid container 213. When the gauge pressure $P_G$ becomes lower than the atmospheric pressure, the liquid level of the third drain flow path 223 reaches the liquid level of the second liquid container 212, and the liquid level of the second drain flow path 222 becomes higher than the liquid level of the second liquid container 212. When the gauge pressure $P_G$ further decreases, the liquid level of the second drain flow path 222 reaches the liquid level of the first liquid container 211, and the liquid level of the first drain flow path 221 becomes higher than the liquid level of the first liquid container 211 (FIG. 6).

(3) Modifications

The present invention is not limited to the above embodiments, and various variations are possible. For example, although the entire second drain flow path 222 is disposed inside the second liquid container 212 in the above embodiment (see FIG. 1), a part of the second drain flow path 222 may be disposed outside the second liquid container 212 as long as even the terminal end 2202 of the second drain flow path 222 is disposed inside the second liquid container 212. Similarly, as long as the terminal end 2203 of the third drain flow path 223 is disposed inside the third liquid container 213, a part of the third drain flow path 223 may be disposed outside the third liquid container 213.

Figure 7:
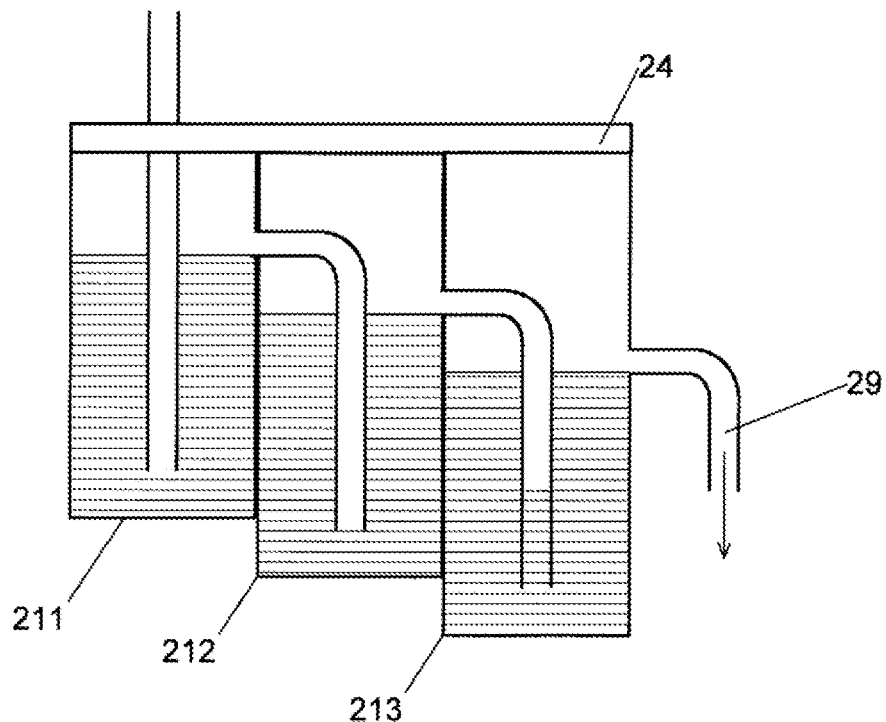
FIG. 7 is a schematic configuration diagram illustrating a modification of the drain pot in the gas analyzer of the present embodiment.
Figure 8:
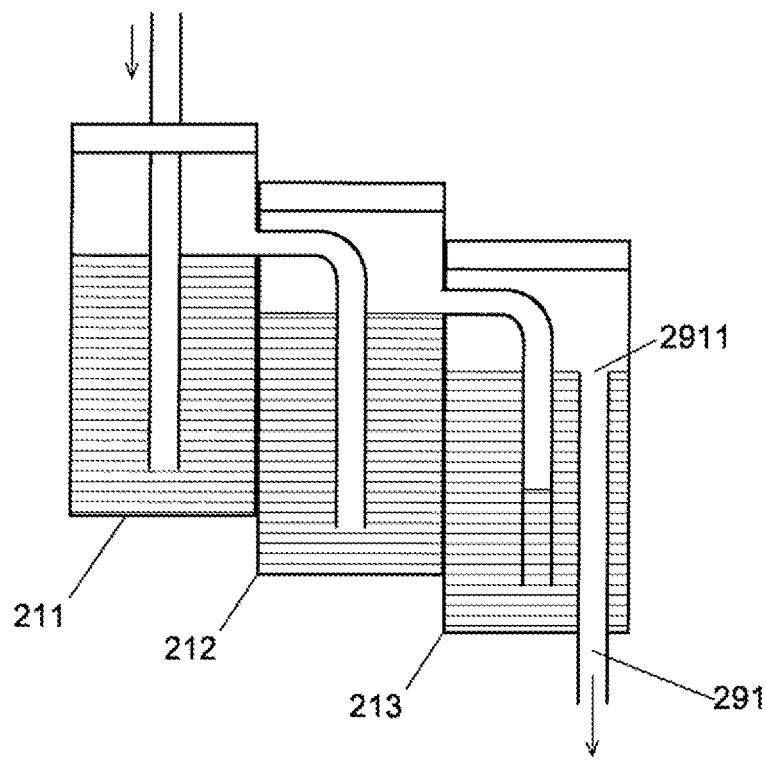
FIG. 8 is a schematic configuration diagram illustrating another modification of the drain pot in the gas analyzer of the present embodiment.

In the above embodiment, one lid (the first lid 241 to the third lid 243) is provided for each container (the first liquid container 211 to the third liquid container 213), but as illustrated in FIG. 7, a common lid 24 may be provided for a plurality of liquid containers.

In the above embodiment, the discharge pipe 29 is connected to the third connection pipe 253 extending outward from the side surface of the third liquid container 213, but instead, a discharge pipe 291 extending upward through the bottom surface of the third liquid container 213 may be used. In this example, when the liquid level in the third liquid container 213 rises to the height of an upper end 2911 of the discharge pipe 291, the liquid in the third liquid container 213 is discharged to the outside of the third liquid container 213.

Figure 9:
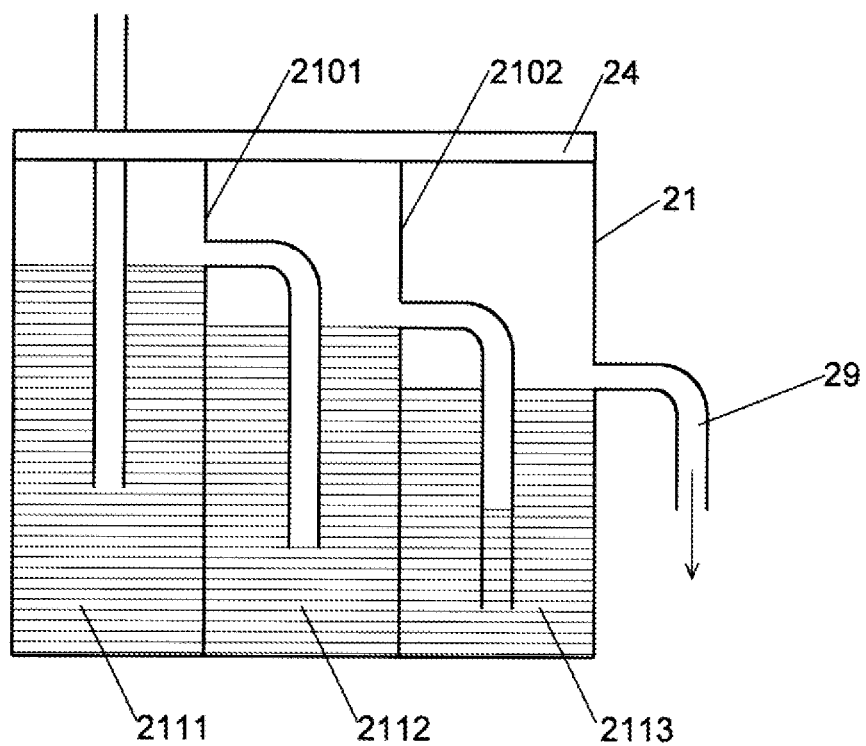
FIG. 9 is a schematic configuration diagram illustrating yet another modification of the drain pot in the gas analyzer of the present embodiment.

In the above embodiment, the plurality of containers (the first liquid container 211 to the third liquid container 213) that can be separated from each other are used, but instead, as illustrated in FIG. 9, a space in one liquid container may be divided into a plurality of partial spaces 2111, 2112, and 2113 by partitions 2101 and 2102, and the plurality of partial spaces 2111 to 2113 may be used as the first liquid container, the second liquid container, and so on in the present invention.

In addition, these embodiment and modifications may be appropriately combined.

ASPECTS

It will be understood by those skilled in the art that the exemplary embodiments described above are specific examples of the following aspects.

Clause 1

A gas analyzer according to clause 1 includes: a gas flow path through which an analysis target gas flows; and a drain pot provided in the gas flow path and disposed upstream of an analysis unit configured to analyze the analysis target gas, the drain pot into which liquid generated by cooling the analysis target gas in the gas flow path is introduced,
wherein the drain pot includes:
a first liquid container configured to receive a terminal end of a first drain flow path from which the liquid generated in the gas flow path is discharged and has a communication port above the terminal end of the first drain flow path;
a second drain flow path provided to extend outward and downward from the communication port of the first liquid container; and
a second liquid container configured to receive a terminal end of the second drain flow path and has a discharge port provided above the terminal end of the first drain flow path and the terminal end of the second drain flow path, and below the communication port.

With the gas analyzer according to clause 1, the height of the entire drain pot can be made smaller than the height of the entire conventional drain pot, so that the drain pot can be small in size.

Clause 2

A gas analyzer according to clause 2 is the gas analyzer according to clause 1, further including:
(N−2) liquid containers represented by any one natural number n from 3 to N that is a natural number greater than or equal to 3, an nth liquid container having an (n−1)th discharge port; and
(N−2) drain flow paths, an nth drain flow path being provided to extend outward and downward from an (n−2)th discharge port of an (n−1)th liquid container, a terminal end of the nth drain flow path being disposed inside the nth liquid container, wherein
the (n−1)th discharge port is provided above a terminal end of the (n−1)th drain flow path and the terminal end of the nth drain flow path, and below the (n−2)th discharge port.

The gas analyzer according to clause 2 includes (N−2) (at least one: N≥3) nth liquid containers having the same configuration as the second liquid container. Therefore, even if the pressure of an analysis target gas becomes higher, the analysis target gas can be water-sealed.

Clause 3

A gas analyzer according to clause 3 is the gas analyzer according to clause 2, wherein
at least two of a combination of the second liquid container and the second drain flow path and a combination of the nth liquid container and the nth drain flow path have the same structure.

In the gas analyzer according to clause 3, two or more sets of liquid containers and drain flow paths (container sets) having the same structure are connected. Accordingly, the second liquid container, one or more of the nth liquid containers, the second drain flow path, one or more of the nth drain flow paths, or the plurality of nth liquid containers (not including the second liquid container) and the plurality of nth drain flow paths (not including the second drain flow path) are formed. According to the gas analyzer of clause 3, it is possible to easily increase or decrease the number of liquid containers depending on the maximum pressure of the analysis target gas. Therefore, it is possible to suppress a space occupied by the drain pot because more liquid containers than necessary are not connected while reliably water-sealing the analysis target gas having the maximum pressure.

REFERENCE SIGNS LIST

10 . . . Gas Analyzer
11 . . . Gas Intake Port
12 . . . Gas Analysis Unit
13 . . . Analysis Target Gas Flow Path
14 . . . Cooling Unit
15 . . . Analysis Target Gas Pump
20 . . . Drain Pot
202, 203, 204 . . . Container Set
21 . . . Liquid Container
2101, 2102 . . . Partition
2111, 2112, 2113 . . . Subspace
211 . . . First Liquid Container
212 . . . Second Liquid Container
213 . . . Third Liquid Container
214 . . . Fourth Liquid Container
2201 . . . Terminal End of First Drain Flow Path
2202 . . . Terminal End of Second Drain Flow Path
2203 . . . Terminal End of Third Drain Flow Path
2204 . . . Terminal End of Fourth Drain Flow Path
221 . . . First Drain Flow Path
222 . . . Second Drain Flow Path
223 . . . Third Drain Flow Path
224 . . . Fourth Drain Flow Path
231 . . . Communication Port
232 . . . First Discharge Port
233 . . . Second Discharge Port
234 . . . Third Discharge Port
24 . . . Lid
241 . . . First Lid
242 . . . Second Lid
243 . . . Third Lid
244 . . . Fourth Lid
251 . . . First Connection Pipe
252 . . . Second Connection Pipe
253 . . . Third Connection Pipe
254 . . . Fourth Connection Pipe
262 . . . First Connection Pipe Insertion Port
263 . . . Second Connection Pipe Insertion Port
29, 291 . . . Discharge Pipe
2911 . . . Upper End of Discharge Pipe
90 . . . Exhaust Gas Generation Facility
91 . . . Gas Collection Probe
92 . . . Pipeline

The invention claimed is:

1. A gas analyzer comprising:
a gas flow path through which an analysis target gas flows; and
a drain pot provided in the gas flow path and disposed upstream of an analysis unit configured to analyze the analysis target gas, the drain pot into which liquid generated by cooling the analysis target gas in the gas flow path is introduced,
wherein the drain pot includes:
a first liquid container configured to receive a terminal end of a first drain flow path from which the liquid generated in the gas flow path is discharged and has a communication port above the terminal end of the first drain flow path;
a second drain flow path provided to extend outward and downward from the communication port of the first liquid container; and
a second liquid container configured to receive a terminal end of the second drain flow path and has a discharge port provided above the terminal end of the first drain flow path and the terminal end of the second drain flow path, and below the communication port.

2. The gas analyzer according to claim 1, further comprising:
(N−2) liquid containers represented by any one natural number n from 3 to N that is a natural number greater than or equal to 3, an nth liquid container having an (n−1)th discharge port; and
(N−2) drain flow paths, an nth drain flow path being provided to extend outward and downward from an (n−2)th discharge port of an (n−1)th liquid container, a terminal end of the nth drain flow path being disposed inside the nth liquid container, wherein
the (n−1)th discharge port is provided above a terminal end of the (n−1)th drain flow path and the terminal end of the nth drain flow path, and below the (n−2)th discharge port.

3. The gas analyzer according to claim 2, wherein at least two of a combination of the second liquid container and the second drain flow path and a combination of the nth liquid container and the nth drain flow path have the same structure.

* * * * *